(12) United States Patent
Lundeen et al.

(10) Patent No.: US 12,649,625 B2
(45) Date of Patent: Jun. 9, 2026

(54) SYSTEMS AND METHODS FOR AUTOMATED PACKAGE TRANSLATION

(71) Applicant: Ford Global Technologies, LLC, Dearborn, MI (US)

(72) Inventors: Kurt Michael Lundeen, Novi, MI (US); John Randolf Vincent, Livonia, MI (US); Timothy Mark Feldkamp, Ann Arbor, MI (US); Yifan Chen, Ann Arbor, MI (US); Justen Fry, Dearborn, MI (US)

( * ) Notice: Subject to any disclaimer, the term of this patent is extended or adjusted under 35 U.S.C. 154(b) by 974 days.

(21) Appl. No.: 17/818,815

(22) Filed: Aug. 10, 2022

(65) Prior Publication Data

US 2024/0051749 A1     Feb. 15, 2024

(51) Int. Cl.
| | |
|---|---|
| *B65G 1/04* | (2006.01) |
| *B65G 13/06* | (2006.01) |
| *B65G 13/07* | (2006.01) |
| *B60P 1/52* | (2006.01) |
| *B60P 3/00* | (2006.01) |

(52) U.S. Cl.
CPC ........... *B65G 1/0478* (2013.01); *B65G 13/06* (2013.01); *B65G 13/07* (2013.01); *B60P 1/52* (2013.01); *B60P 3/007* (2013.01); *B65G 2207/34* (2013.01)

(58) Field of Classification Search
CPC ....... B65G 1/0478; B65G 13/06; B65G 13/07
USPC ........................................................ 700/214
See application file for complete search history.

(56) References Cited

U.S. PATENT DOCUMENTS

| | | | |
|---|---|---|---|
| 8,425,173 B2 | 4/2013 | Lert et al. | |
| 8,784,034 B2 | 7/2014 | Lert, Jr. | |
| 10,507,754 B2 | 12/2019 | Ellis et al. | |
| 10,604,343 B2 | 3/2020 | Gravelle et al. | |
| 2007/0276535 A1* | 11/2007 | Haag .................... | B65G 1/0485 |
| | | | 700/217 |
| 2009/0263228 A1* | 10/2009 | Tygard .................. | B65D 19/38 |
| | | | 414/800 |
| 2011/0218670 A1* | 9/2011 | Bell ...................... | B66F 9/0755 |
| | | | 700/214 |
| 2014/0023476 A1* | 1/2014 | Neuwirth ............... | B65G 1/026 |
| | | | 108/51.11 |
| 2018/0072546 A1 | 3/2018 | Hognaland | |
| 2019/0168967 A1* | 6/2019 | Jin ......................... | B65G 1/065 |
| 2021/0229916 A1 | 7/2021 | Austrheim | |

OTHER PUBLICATIONS

Attabotics, 3D Robotic Cube Storage for Next-Level Order Processing, Bastian Solutions—Toyotal Advanced Logistics, 1-6.

* cited by examiner

*Primary Examiner* — Jacob S. Scott
*Assistant Examiner* — Michael E Butler
(74) *Attorney, Agent, or Firm* — Emily Campbell; Eversheds Sutherland (US) LLP

(57) ABSTRACT

Automated package translation apparatuses and methods are disclosed herein. An example apparatus can include a grid having a plurality of tiles, each of the plurality of tiles including translation members that are controlled by translation motors, the translation members providing movement of a bin in at least two directions, as well as gates that allow or prevent the bin from translating across a tile to an adjacent tile. The gates can be controlled by gate motors. A controller having a processor and memory, the processor executes instructions stored in the memory to activate the translation motors and the gate motors in a predetermined sequence to move the bin from a first tile to a second tile.

20 Claims, 6 Drawing Sheets

SYSTEMS AND METHODS FOR AUTOMATED PACKAGE TRANSLATION

BACKGROUND

Vehicle-based package delivery systems and methods each suffer from various time inefficiencies and challenges. For example, at the beginning of each delivery shift, packages must be hand-loaded into the vehicle, which is physically demanding and time-consuming. During the delivery process, the driver must enter the cargo area of the vehicle, search for packages, pick them up, and carry them out of the vehicle. The driver may experience ergonomic challenges associated with climbing through tight spaces inside the vehicle and bending over to pick up packages.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
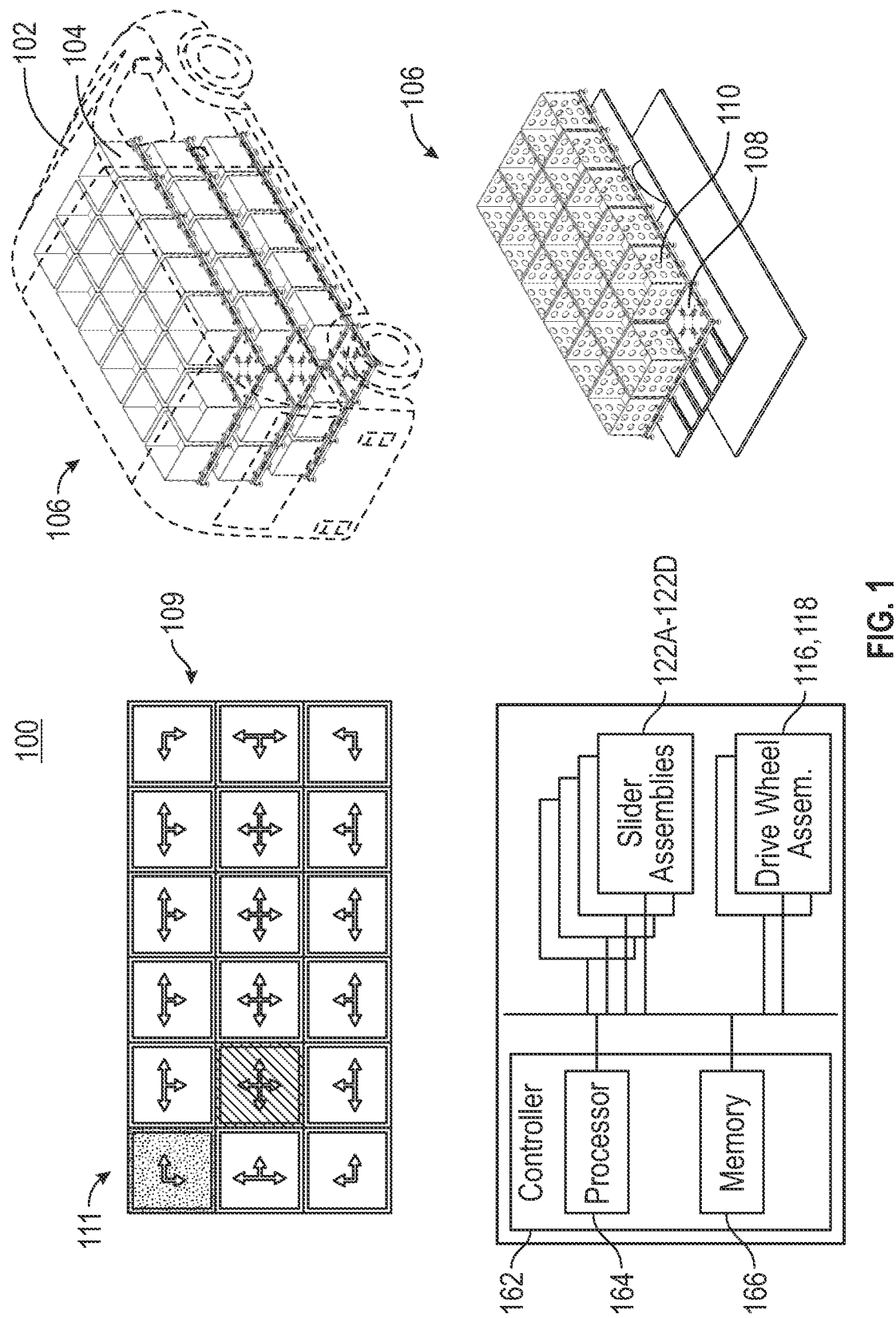
FIG. 1 illustrates an example environment where aspects of the present disclosure may be practiced according to one or more embodiments.

The present disclosure pertains to systems and methods for automatically managing inventory inside a delivery vehicle, as well as the design of physical hardware needed to realize bin motion inside a delivery vehicle. In one configuration, the present disclosure pertains to a means of moving bins in any of four directions (could be fewer or more) in a horizontal plane (orthogonal directions in the preferred embodiment). The disclosure also provides means for physically securing bins within the vehicle to prevent theft or undesirable movement caused by vehicle dynamics (e.g., hard braking, sharp turns, inclines, speed bumps, potholes, and so forth).

The mechanical system includes one or more layers (levels, floors, and so forth) stacked in a vertical configuration. Each layer may comprise a grid of uniform cells spanning a plane. The sizes of the cells can differ between layers. The length, width, and height of a cell are all independent parameters, so a cell may have a rectangular footprint or profile. The faces of a cell need not be perpendicular, so rhomboid-shaped cells are possible. Generally, each cell contains a tile for securing and moving bins. A cell may be bin-less or occupied as bins move about the cargo space. Each layer maintains at least one bin-less cell to enable the bins to move (i.e., to avoid gridlock).

An example system includes a plurality of modular tiles and a variety of bins with standardized bases. The tiles can be assembled into various configurations (e.g., 2×2, 3×6, "L" shape, etc.) to accommodate the needs of the particular application. Each tile can include two sets of drive wheels for propelling bins along two axes. The axes are perpendicular in some instances, but non-perpendicular configurations are also possible. The first set of drive wheels propels bins along the positive or negative directions of the first axis, and the second set of drive wheels propels bins along the positive or negative directions of the second axis. In one example, one set of drive wheels propels bins toward the front or rear of the vehicle, and the other set of drive wheels propels them toward the driver's side or passenger's side (left or right). In another example, each set of drive wheels includes two drive wheel assemblies.

In some instances, each drive wheel assembly comprises one drive shaft, a one-toothed (synchronous) pulley, and two omnidirectional wheels generally referred to as translation members. The omnidirectional wheels allow the bin to move in the transverse direction when the wheel is stationary. Stated otherwise, the omnidirectional wheels can translate the bin along a first axis A1 and allow the bin to translate in a perpendicular direction to the first axis when the omnidirectional wheels are stationary The two drive wheel assemblies may be connected by a toothed belt that transmits motion from one drive wheel assembly to the other, although other forms of transmission could also be used, such as gears, chains, sprockets, V-belts, and so forth.

One of the drive shafts in each set of drive wheels can be driven by an electric motor. Alternatively, the drive shaft could be driven by other means, such as by a hydraulic or pneumatic motor. Alternatively, the motion could be produced by the vehicle's drive train and transmitted via shafts, pulleys, chains (or another similar mechanism) to the driveshafts, and then engaged or disengaged by such means as dynamic belt tensioning or electric pulley clutches. Alternatively, the mechanical transmission may be avoided altogether if each drive wheel assembly is driven by its motor.

In some instances, gates are located around the perimeter of each tile. When gates are in the closed position, they prevent bins from passing; when they are in the open position, they provide pathways for bins to pass through. That is, the gates allow or prevent the bin from translating across a tile to another adjacent tile. Gates can be formed by two sliders, which translate inward to a predefined position to block the pathway, or apart to a predefined position to open the pathway. Alternatively, gates may be formed by other means, such as by actuating pins, rollers, or walls upward using solenoids, motors, or pneumatic pistons from the tile to block the pathway. Motors may include any actuation device, including linear, rotary, or the like.

Sliders may be driven by a rack and pinion mounted on a central electric motor. Alternatively, the sliders could be driven by belt and pulley, chain and sprocket, ball screw, linear actuator, pneumatic piston, electric slide rail, or other similar mechanical components. Sliders may be actuated by a single electric motor. Alternatively, the sliders could be actuated by other means, such as hydraulic motor, pneumatic motor, pneumatic piston, or electric rail. In the preferred embodiment, the slider translates within a channel. Alternatively, other forms of guides could be used, such as V-grooves, linear shafts, linear rails, and so forth.

Rollers can be mounted on the sliders. One function of the rollers is to retain the bins from lifting off the tiles due to vehicle dynamics or attempted theft. Another function is to guide the motion of the bins as they are being moved in or out of a tile. Yet another function is to reduce friction between the slider and bin as the gate opens and closes. Rollers can have a U-shaped profile, but other profiles could be used, such as rectangular or V.

A bin assembly of the present disclosure can comprise two distinct portions. A lower portion is referred to as the bin base and an upper portion is referred to as the bin container. In some applications, it may be desirable for the bin container to be rigidly fastened to the bin base, while in other applications it might be desirable to remove it from the base. In such applications, it might be possible to use dowel pins near the four corners, mushroom-head pins, Velcro®, Dual Lock™, magnets, or latch mechanisms to allow the container to be retained in transit yet removable when desired. Another advantage of isolating the bin container from the base is that it allows the system to work with a variety of bin containers. For example, containers could take the form of wooden bins, plastic bins, flexible plastic totes, coolers (thermally insulated containers), shelves, racks, etc. In the preferred embodiment, the bin base has V-grooves on its sides, which mesh with the gate rollers. Alternatively, other profile shapes could be used, such as rectangular or U. The bottom surface of the bin base has a high coefficient of friction or texture for increasing traction with the drive wheels. Such desirable surface characteristics can be achieved by directly forming a texture into the base, applying a coating, or adhering to a mat.

Illustrative Embodiments

Turning now to the drawings, FIG. 1 depicts an illustrative architecture 100 in which techniques and structures of the present disclosure may be implemented. The architecture 100 includes a vehicle 102 having a cargo area 104 that includes a package assembly (assembly 106) of the present disclosure. In general, the assembly 106 can include a plurality of tiles, such as tile 108 and a plurality of bins, such as bin 110 that are arranged into a grid 109. A single tile and bin in combination may be referred to as a cell. The cells can be arranged into a grid. Bins can be translated from tile to tile as will be disclosed herein. An example schematic view 111 of the tile 108 is illustrated showing the potential direction of bin movement available for each cell. As noted above, the sizes of the cells can differ between layers. For example, a first layer can include bins having a first size, and a second layer can include bins having a second size, where the first size and the second size are different from one another in at least one dimension.

The length, width, and height of a cell are all independent parameters, so a cell may have a rectangular footprint or profile. The faces of a cell need not be perpendicular, so rhomboid-shaped cells are possible, just as an example. Generally, each cell contains a tile for securing and moving bins. A cell may be bin-less or occupied as bins move about the cargo space. Each layer maintains at least one bin-less cell to enable the bins to move (i.e., to avoid gridlock). In operation, a bin can be moved into the space of the grid, which opens a space where the bin was previously. Another bin can be moved into this gap. This process can be repeated to move or shuffle the boxes into various configurations. For example, a shuffling process can be used to move packages into certain locations, such as in front of a cargo door, a window, or other accessible areas. The packages can be shuffled into a delivery order or according to size, just as examples.

The assembly 106 can include one or more layers, which each include at least one tile and a plurality of bins. The layers can be arranged in vertical alignment or can be staggered or offset depending on the shape of the cargo area 104.

Figure 2:
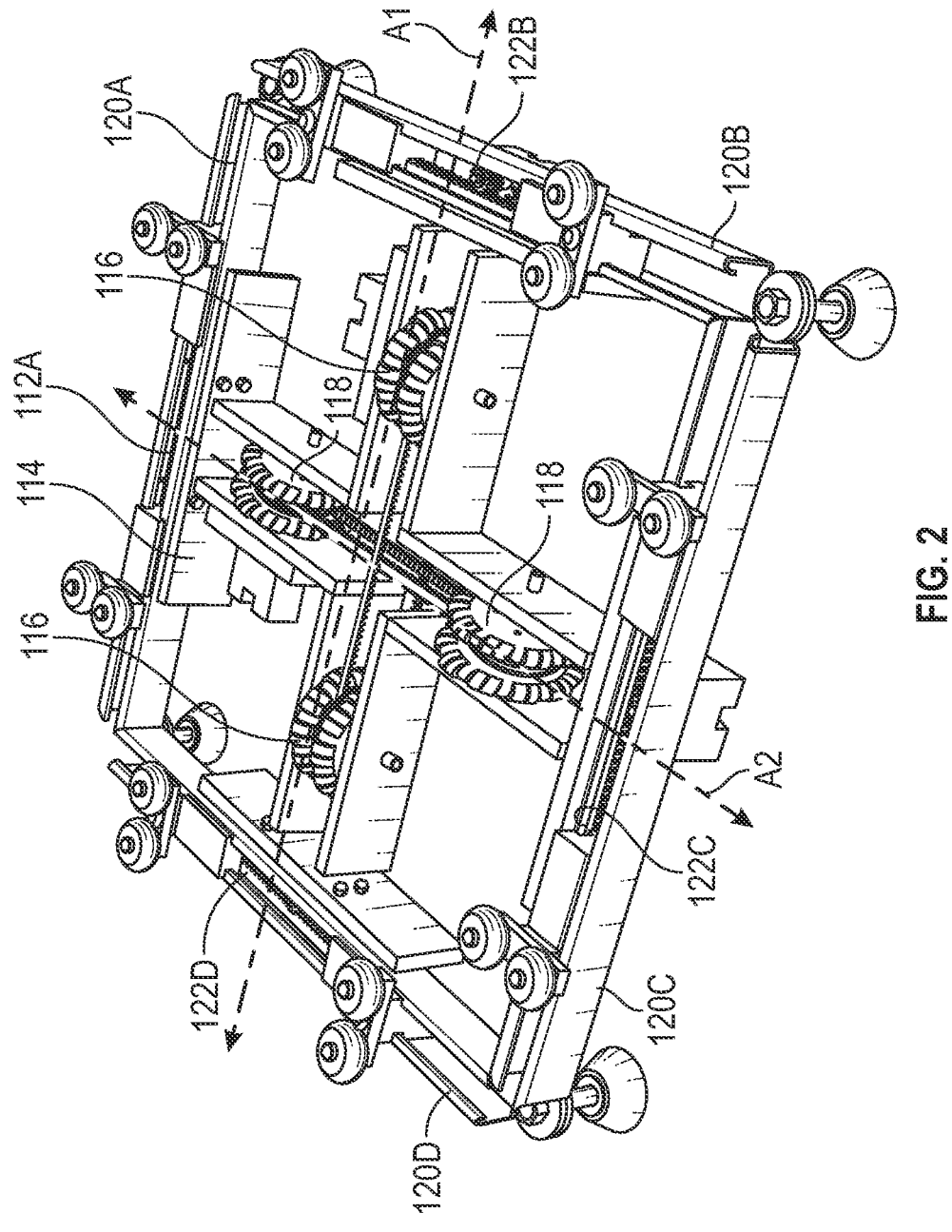
FIG. 2 is a perspective view of an example tile (with the top and bottom plates omitted for visual clarity) of the present disclosure according to one or more embodiments.

Referring now to FIG. 2, which illustrates an example tile 108, which can include a frame 114, a first drive wheel assembly 116, a second drive wheel assembly 118, gates 120A-120D, slider assemblies 122A-122D, and plurality of sets of rollers such as rollers 124A. The gates 120A-120D are arranged to form a periphery of the tile 108. In some instances, the tile 108 can include adjustable feet that are placed at the corners of the tile 108, as will be discussed in greater detail herein. The adjustable feet space the tile away from a floor of the cargo space or an adjacent tile and can be adjusted to level the tile.

In general, the frame 114 provides structural support for the drive wheel assemblies. The individual components of the frame 114 can span between the gates 120A-120D. In some instances, the gates 120A-120D can be arranged into a polygonal structure such as a square or rectangle, however any desired shape can be used.

Figure 3:
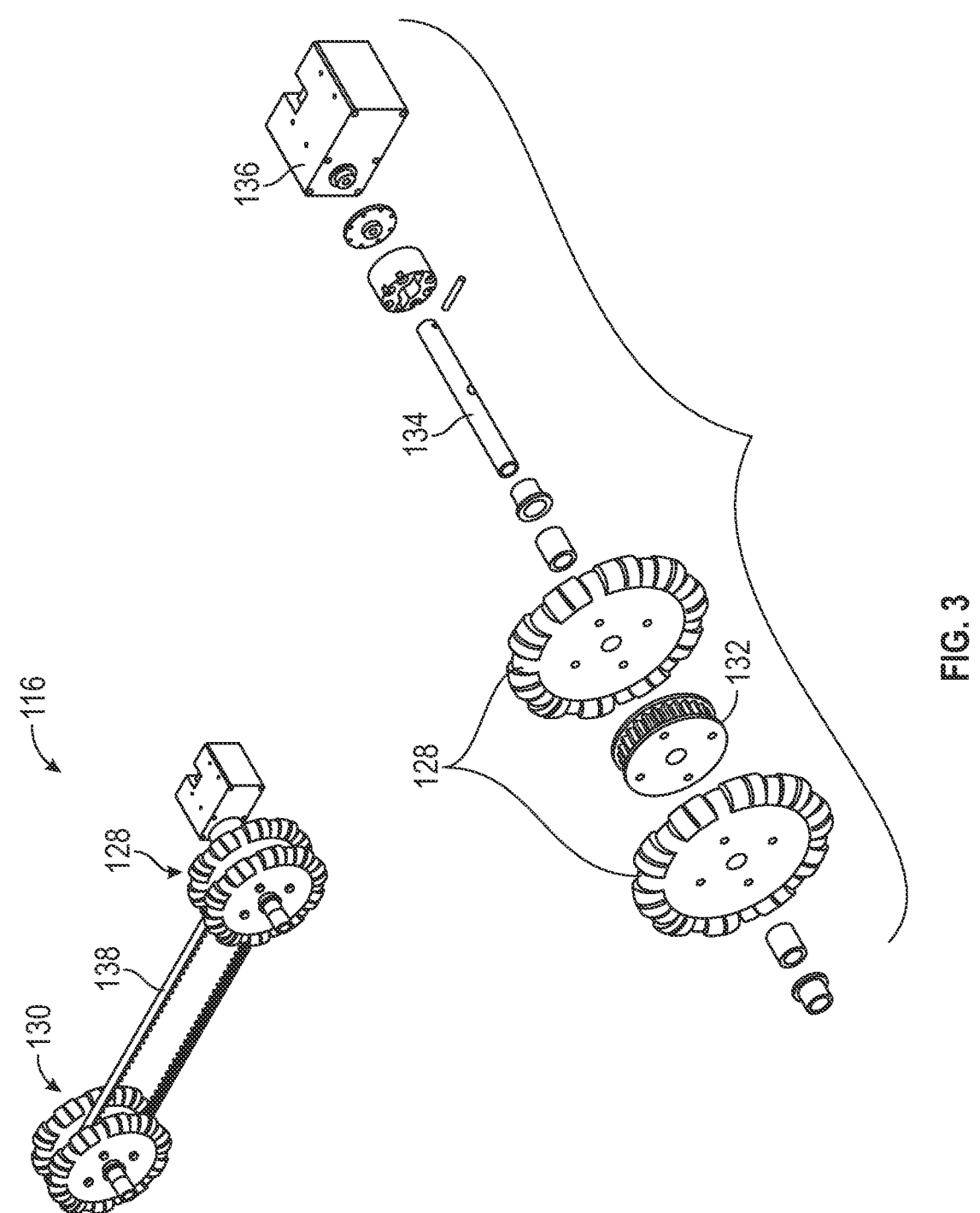
FIG. 3 is an exploded perspective view of an example drive wheel assembly according to one or more embodiments.

FIG. 3 illustrates the first drive wheel assembly 116. The first drive wheel assembly 116 includes two sets of omni-directional wheels 128 and 130, a toothed pulley 132, a drive shaft 134, a translation motor 136, and a belt 138. To be sure, additional components can be included and have been omitted for purposes of brevity. In general, the translation motor 136 is operated by a controller, which is disclosed in greater detail herein. The translation motor 136 can be activated to rotate the two sets of omnidirectional wheels 128 and 130 in a forward or reverse direction. The two sets of omnidirectional wheels 128 and 130 engage with a bottom plate of a bin to translate the bin across the tile.

In more detail, the drive shaft 134 transfers the rotational output of the motor 136 to the toothed pulley 132, which is coupled to a first pair of the two sets of omnidirectional wheels 128, as well as the belt 138. The belt spans between the two sets of omnidirectional wheels 128 and 130, such that when the first pair of the two sets of omnidirectional wheels 128 is rotated, the belt transfers this rotation to the second pair of the two sets of omnidirectional wheels 130.

As noted above, rather than using a belt, other forms of transmission could also be used, such as gears, chains, sprockets, V-belts, and so forth. It will be understood that the second drive wheel assembly 118 is constructed similarly to the first drive wheel assembly 116. It will be understood that the size of the toothed pulley of the second drive wheel assembly 118 is smaller than the toothed pulley of the first drive wheel assembly 116 so that the first drive wheel assembly 116 and the second drive wheel assembly 118 can be integrated into the tile 108 together and provide bin movement in two axes. Stated otherwise, the second drive belt of the second drive wheel assembly is positioned inside a belt perimeter of the belt 138.

The first drive wheel assembly 116 translates a bin along a first axis and the second drive wheel assembly 118 translates a bin along a second axis A2 that is perpendicular to the first axis. To be sure, additional drive wheel assemblies can be included to provide bin movement along additional axes than those shown. The bin can translate transversely across an omnidirectional wheel when the omnidirectional wheel is stationary due to rollers located at the periphery of the omnidirectional wheel. The rollers are oriented perpendicularly to the axis of rotation of the wheel.

Figure 4:
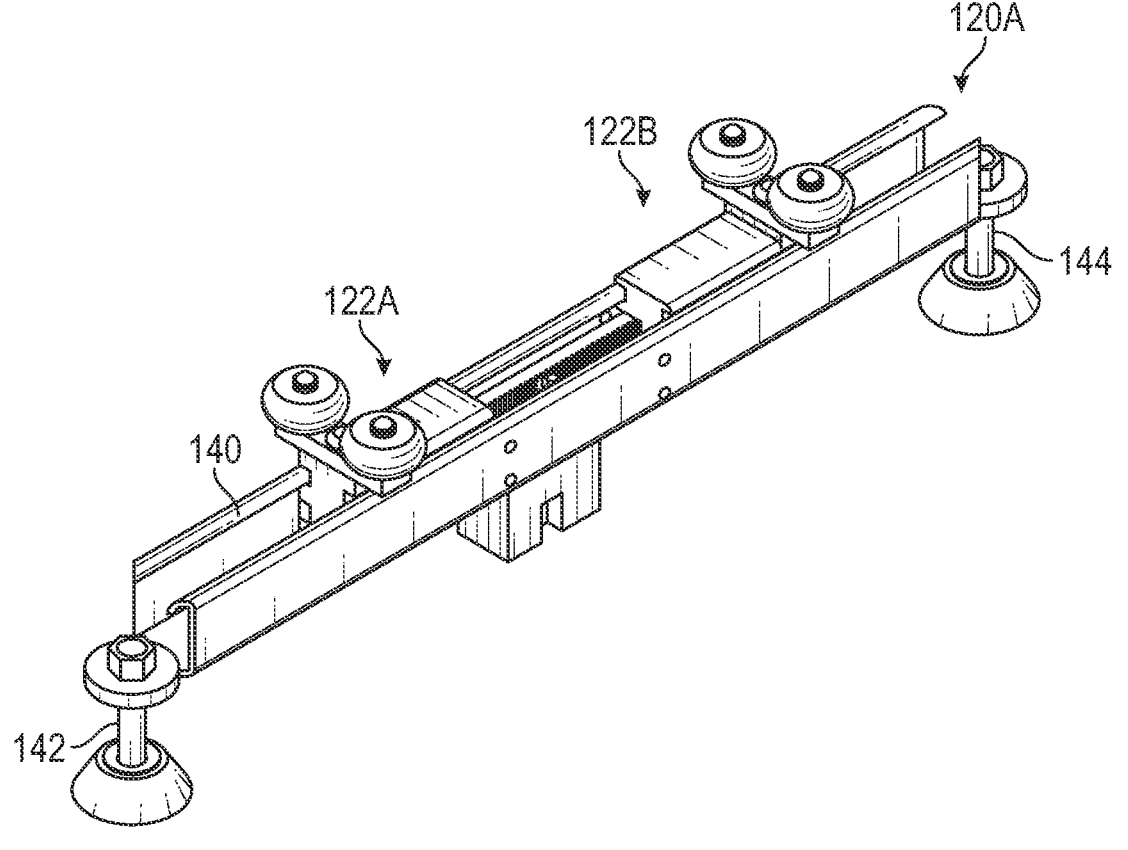
FIG. 4 is a perspective view and top plan view of an example gate according to one or more embodiments.
Figure 4:
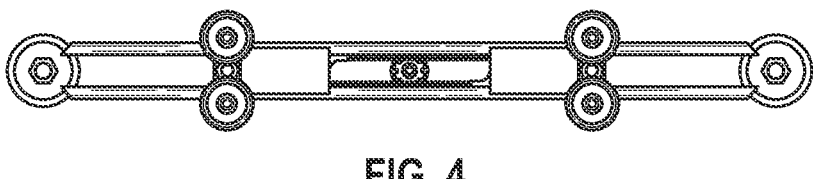

FIG. 4 illustrates an example gate, such as gate 120A. The gate 120A includes a body 140, which can include a channel having terminal ends that include adjustable feet, such as a first foot 142 and a second foot 144. The body 140 can receive both of the slider assemblies, such as slider assembly 122A and slider assembly 122B.

Gates form the perimeter of the tile. When gates are in a closed position (drawn in towards the pinon gear), they prevent bins from passing; when they are in an open position, they provide pathways for bins to pass through. That is, the slider assemblies translate inward to a predefined position to block the pathway, or apart to a predefined position to open the pathway. As noted above, gates may be formed by other means, such as by actuating pins, rollers, or walls upward using solenoids, motors, or pneumatic pistons from the tile to block and/or open a pathway for bin translation.

Figure 5:
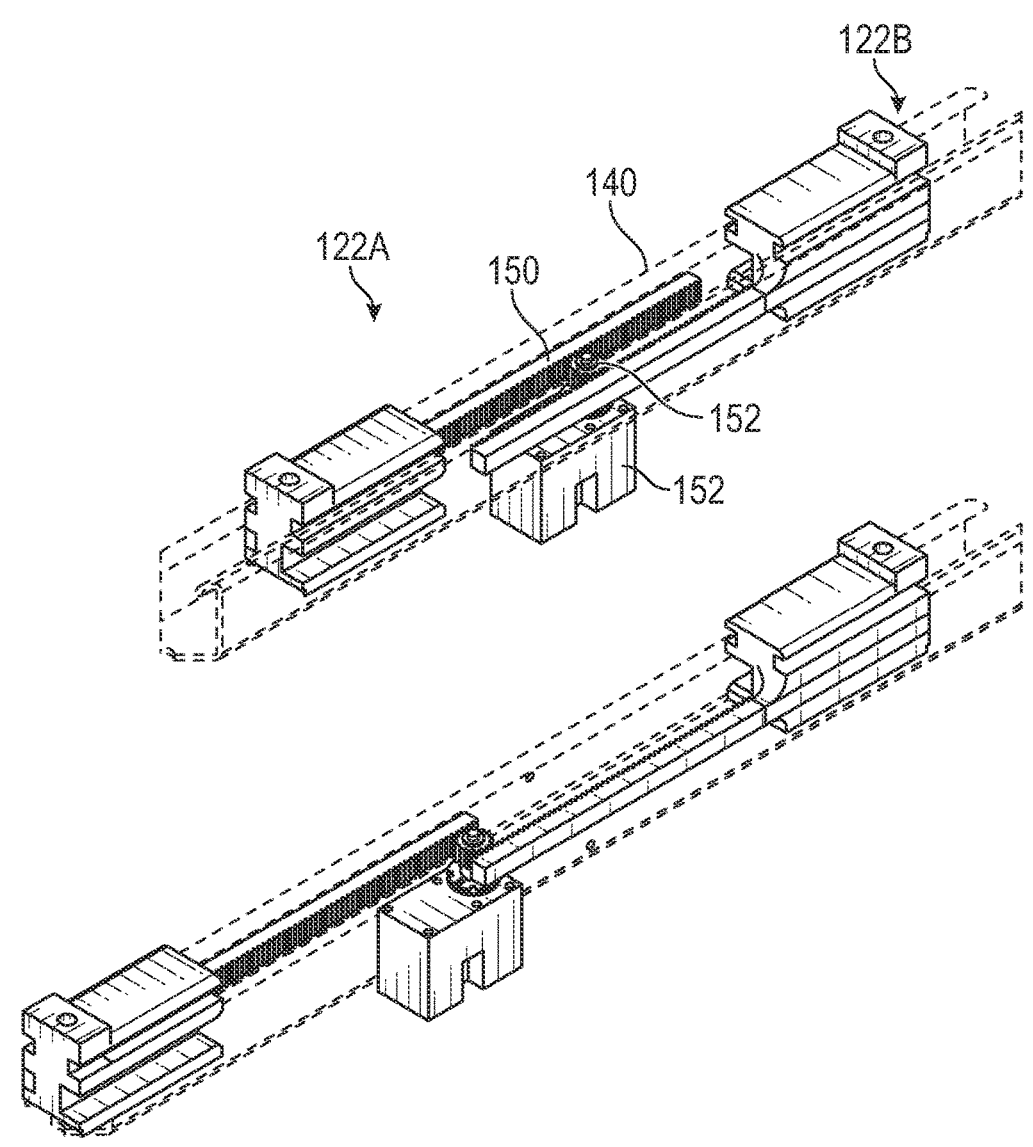
FIG. 5 is a perspective view of an example slider in both open and closed positions according to one or more embodiments.

Referring now to FIG. 5, the slider assembly 122A includes a sliding body 146, which translates within a channel of the body 140. Rather than a channel, the body can include V-grooves, linear shafts, linear rails, or other equivalent structures.

Each slider assembly, such as slider assembly 122A can include a gear rack 150 which includes a shaft with teeth that engage with a pinion gear 152 associated with a gate motor 154. Actuation of the gate motor can cause the sliding bodies to move towards and/or away from one another. In some instances, each sliding body can include rollers. For example, sliding body 146 can include a pair of rollers 124A and 124B, the function of the rollers are disclosed infra. While sliders can be driven by a rack and pinion mounted on a central electric motor, the sliders can be driven by a belt and pulley, chain and sprocket, ball screw, linear actuator, pneumatic piston, electric slide rail, or other equivalents. Sliders may be actuated by a single electric motor. Alternatively, the sliders could be actuated by other means, such as hydraulic motor, pneumatic motor, pneumatic piston, or electric rail.

One function of the rollers is to retain the bins from lifting off the tiles due to vehicle dynamics or attempted theft. Another function is to guide the motion of the bins as they are being moved in or out of a tile. Yet another function is to reduce friction between the slider and bin as the gate opens and closes. In some examples, the rollers have a U-shaped profile, but other profiles could be used, such as rectangular or V.

Figure 6:
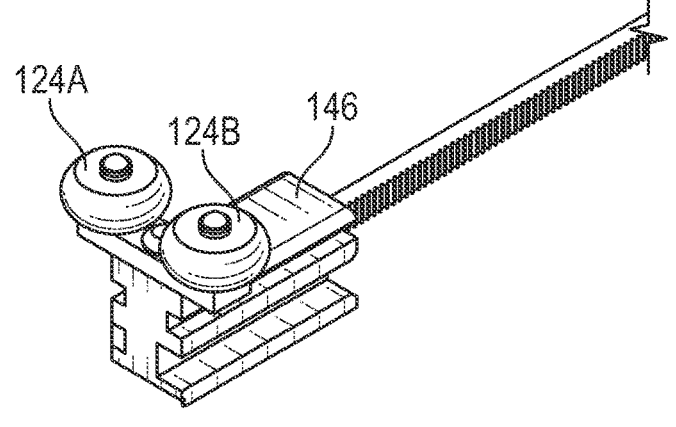
FIG. 6 is a perspective view of a pair of rollers for use on a slider according to one or more embodiments.
Figure 7:
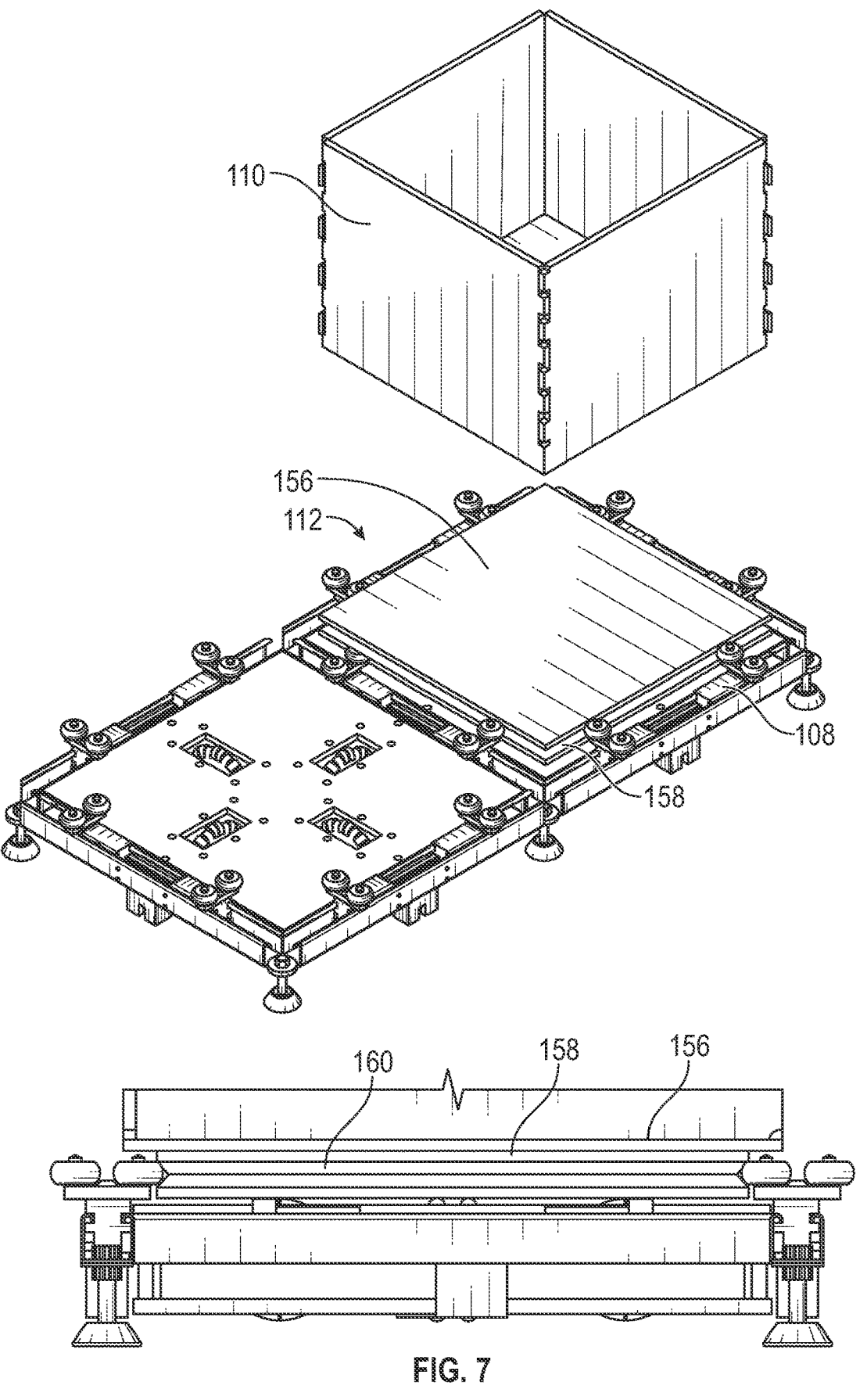
FIG. 7 is a perspective view of a bin and a bin base, in combination with a tile according to one or more embodiments.

FIG. 6 illustrates the interface between bin 110 and the tile 108. In some instances, the bin 110 and tile 108 interface using a bin base 112. The bin 110 can be placed onto the bin base 112. The bin base 112 includes a support plate 156 and track plate 158. The support plate 156 receives the bin 110 and the track plate 158 is configured to interface with rollers of the tile 108. In more detail, the track plate 158 includes a track groove 160 that extends around a periphery of the track plate 158. The shape and size of the track groove 160 can depend on the shape and size of the rollers of the tile 108.

In some applications, it may be desirable for the bin 110 to be rigidly fastened to the bin base 112, while in other applications it might be desirable to remove it from the base. In such applications, releasable fasteners can be used at the four corners. For example, releasable fasteners can include mushroom-head pins, Velcro®, Dual Lock™, magnets, or latch mechanisms to allow the container to be retained in transit yet removable when desired.

Another advantage of isolating the bin container from the bin base 112 is that it allows the system to work with a variety of bin containers. For example, containers could take the form of wooden bins, plastic bins, flexible plastic totes, coolers (thermally insulated containers), shelves, racks, and so forth.

The bottom surface of the bin base 112 can have a high coefficient of friction or texture for the purpose of increasing traction with the drive wheels. Such desirable surface characteristics can be achieved by directly forming a texture into the base, applying a coating, or adhering to a mat.

Referring back to FIG. 1, the assembly 106 can be operated by a controller 162. Generally, the controller 162 includes a processor 164 and memory 166. The processor 164 executes instructions stored in memory 166 to control tile operations, and therefore bin movement across the grid of tiles. The controller 162 can be configured to activate the motors associated with the drive wheel assemblies 116 and 118, as well as the solenoids/motors associated with the slider assemblies 122A-122D. In one example, the instructions can include permutations of motor activations in predetermined order to open and/or close gates, as well as translate bins across the grid from tile to tile. As noted above, some translation operations include moving the bins along one or more axes. Translation can also include moving the bin transversely across omnidirectional wheels. Combinations of the gate and/or wheel movement can be used to shuffle or reposition bins on the grid.

As noted above, the controller 162 can be configured to cause the bins on the grid of tiles to move in specific patterns to position one or more bins in particular locations. In one example, the bins can be shuffled in accordance with a delivery schedule. Thus, as the vehicle 102 is driven from location to location, the bins can be moved across the grid to place the next package on the delivery route in a predetermined location. For example, the bin can be moved to a location in front of a delivery door to provide the user with easy access to the bin. Generally, the controller 162 can activate the translation motors and the gate motors in a predetermined sequence to move the bin from a first tile to a second tile. Again, many tiles can be moved in sequence using this methodology.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An apparatus comprising:
a grid comprising a plurality of tiles, each of the plurality of tiles comprising:
translation members that are controlled by translation motors, the translation members providing movement of a bin in at least two directions; and
gates that allow or prevent the bin from translating across a tile to an adjacent tile, the gates being controlled by gate motors;
a controller comprising a processor and memory, the processor executes instructions stored in the memory to:
activate the translation motors and the gate motors in a predetermined sequence to move the bin from a first tile to a second tile.

2. The apparatus according to claim 1, wherein each of the translation members comprises:
a first pair of omnidirectional wheels with a first pulley placed therebetween;
a second pair of omnidirectional wheels with a second pulley placed therebetween;

a drive shaft coupling the first pulley to a first one of the translation motors; and
a first drive belt coupling the first pulley and the second pulley.

3. The apparatus according to claim 2, wherein a second translation member includes a second drive belt that is positioned inside a belt perimeter of the first drive belt.

4. The apparatus according to claim 1, wherein each of the gates comprises:
a body having opposing terminal ends;
two slider assemblies that mate with the body, each of the slider assemblies comprising a sliding body and a pinion rack;
a pinion gear coupled with the pinion racks of the two slider assemblies; and
a pinion motor that is configured to move the sliding bodies, wherein when the sliding bodies are moved to a closed position, the bin is retained on the tile and when the sliding bodies are moved to an open position the bin is allowed to move to the adjacent tile.

5. The apparatus according to claim 4, wherein the body includes a channel that receives the two slider assemblies.

6. The apparatus according to claim 5, wherein the body includes an adjustable foot placed at each of the opposing terminal ends.

7. The apparatus according to claim 4, wherein the gates are arranged into a polygonal configuration and form a periphery of a tile.

8. The apparatus according to claim 4, further comprising a pair of wheels disposed on each of the sliding bodies of the two slider assemblies.

9. The apparatus according to claim 8, further comprising a bin base that engages with the translation members and the gates of the tile.

10. The apparatus according to claim 9, wherein the bin base includes a support plate that receives the bin and track plate that engages with the translation members and the gates of the tile.

11. The apparatus according to claim 10, wherein the track plate comprises a groove that receives the pair of wheels of each of the two slider assemblies of the gates, the pair of wheels reducing movement of the bin.

12. An apparatus comprising:
a plurality of bins;
a grid comprising a plurality of tiles, wherein all but one of the plurality of tiles receives one of the plurality of bins, each of the plurality of tiles comprising:
translation members that provide movement of a bin of the plurality of bins in at least two directions; and
gates that allow or prevent the bin from translating across a tile to an adjacent tile, the gates,
wherein the plurality of bins can be moved according to a predetermined pattern using the translation members and gates.

13. The apparatus according to claim 12, wherein the translation members are actuated by translation motors.

14. The apparatus according to claim 13, wherein a first set of the translation members comprises omnidirectional wheels that can translate the bin along a first axis and allow the bin to translate in a perpendicular direction to the first axis when the omnidirectional wheels are stationary.

15. The apparatus according to claim 12, wherein each of the gates comprises:
a body having opposing terminal ends;
two slider assemblies that mate with the body, each of the slider assemblies comprising a sliding body and a pinion rack;

a pinion gear coupled with the pinion racks of the two slider assemblies; and a pinion motor that is configured to move the sliding bodies, wherein when the sliding bodies are moved to a closed position, the bin is retained on the tile and when the sliding bodies are moved to an open position the bin is allowed to move to the adjacent tile.

16. The apparatus according to claim 15, wherein the body includes a channel that receives the two slider assemblies, and an adjustable foot placed at each of the opposing terminal ends.

17. The apparatus according to claim 16, wherein the gates are arranged into a polygonal configuration and form a periphery of a tile.

18. The apparatus according to claim 17, further comprising a pair of wheels disposed on each of the sliding bodies of the two slider assemblies.

19. The apparatus according to claim 18, further comprising a bin base that engages with the translation members and the gates of the tile.

20. The apparatus according to claim 19, further comprising a controller comprising a processor and memory, the processor executes instructions stored in the memory to activate translation motors of the translation members and gate motors of the gates in a predetermined sequence to move the bin from a first tile to a second tile.

* * * * *